United States Patent
Nishikawa et al.

(10) Patent No.: US 8,887,580 B2
(45) Date of Patent: *Nov. 18, 2014

(54) TORQUE DETECTION DEVICE, METHOD OF MANUFACTURING TORQUE DETECTION DEVICE, AND ELECTRIC POWER STEERING SYSTEM INCLUDING TORQUE DETECTION DEVICE

(71) Applicant: JTEKT Corporation, Osaka (JP)

(72) Inventors: Genki Nishikawa, Toyota (JP); Akihiro Takeuchi, Kashiba (JP); Masahiro Kandatsu, Kurashiki (JP)

(73) Assignee: JTEKT Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/763,942

(22) Filed: Feb. 11, 2013

(65) Prior Publication Data

US 2013/0220030 A1 Aug. 29, 2013

(30) Foreign Application Priority Data

Feb. 28, 2012 (JP) .................................. 2012-042100

(51) Int. Cl.
G01L 3/00 (2006.01)
G01L 3/10 (2006.01)
B62D 6/10 (2006.01)

(52) U.S. Cl.
CPC .. G01L 3/101 (2013.01); B62D 6/10 (2013.01)
USPC .................................................... 73/862.331

(58) Field of Classification Search
USPC .................. 73/862.331–862.338, 862.325
See application file for complete search history.

(56) References Cited

U.S. PATENT DOCUMENTS

| 7,568,400 | B2 * | 8/2009 | Tokumoto et al. | ........ 73/862.333 |
|---|---|---|---|---|
| 8,015,885 | B2 * | 9/2011 | Arita et al. | ............... 73/862.333 |
| 8,047,325 | B2 * | 11/2011 | Saitou et al. | .................. 180/444 |
| 8,398,230 | B2 * | 3/2013 | Matsuhashi | ................... 347/102 |
| 2008/0028870 | A1 | 2/2008 | Tokumoto et al. | |
| 2010/0071481 | A1 | 3/2010 | Arita et al. | |
| 2011/0005340 | A1 | 1/2011 | Jeon et al. | |
| 2013/0192390 | A1 * | 8/2013 | Shidahara et al. | ........ 73/862.325 |

FOREIGN PATENT DOCUMENTS

JP  A-2008-249598  10/2008
WO  WO 2011/122775 A2  10/2011

OTHER PUBLICATIONS

Apr. 7, 2014 Extended European Search Report issued in European Patent Application No. 13156553.3.

* cited by examiner

*Primary Examiner* — Lisa Caputo
*Assistant Examiner* — Octavia Hollington
(74) *Attorney, Agent, or Firm* — Oliff PLC

(57) ABSTRACT

A torque detection device includes: a magnetic flux collecting unit that includes an annular holder formed by resin molding and having a through-hole that passes through the holder in a radial direction, a first magnetic flux collecting ring and a second magnetic flux collecting ring that are fitted to an inner periphery of the holder so as not to cover the through-hole, and a magnetic shield that is fitted to an outer periphery of the holder so as to cover the through-hole; and a sensor housing that is made of resin supplied onto an outer periphery of the magnetic flux collecting unit, and that is formed so as to be integrated with the magnetic flux collecting unit.

5 Claims, 9 Drawing Sheets

TORQUE DETECTION DEVICE, METHOD OF MANUFACTURING TORQUE DETECTION DEVICE, AND ELECTRIC POWER STEERING SYSTEM INCLUDING TORQUE DETECTION DEVICE

INCORPORATION BY REFERENCE/RELATED APPLICATION

This application claims priority to Japanese Patent Application No. 2012-042100 filed on Feb. 28, 2012 the disclosure of which, including the specification, drawings and abstract, is incorporated herein by reference in its entirety.

BACKGROUND OF THE INVENTION

1. Field of the Invention

The invention relates to a torque detection device that includes a magnetic flux collecting unit that collects magnetic fluxes from a magnetic yoke and a sensor housing that is formed so as to be integrated with the magnetic flux collecting unit, a method of manufacturing the torque detection device, and an electric power steering system that includes the torque detection device.

2. Discussion of Background

A torque detection device described in US2010/0071481 A1 includes a unit that has magnetic flux collecting rings, a ring holder and a magnetic shield. The magnetic flux collecting rings are fitted to the inner periphery of the ring holder. The magnetic shield is fitted to the outer periphery of the ring holder. The unit is inserted into a housing through an insertion hole formed in the housing, and is fixed to the housing.

In the torque detection device, water may enter the inside of the device through a gap between the unit and the housing. Therefore, in order to improve the waterproof property of the torque detection device, there may be employed a method of manufacturing the torque detection device, according to which the sensor housing is formed so as to be integrated with the unit by supplying resin onto the outer periphery of the unit.

However, with the above-described manufacturing method, the sensor housing and the unit are formed so as to be integrated with each other, and the magnetic shield is located between the ring holder and the sensor housing. Therefore, it is difficult for a worker for an after-process (for example, a quality control person) to check whether the magnetic shield is assembled inside the torque detection device.

SUMMARY OF THE INVENTION

The invention provides a torque detection device that is configured to make it possible to easily perform a work for checking whether there is a magnetic shield, a method of manufacturing the torque detection device, and an electric power steering system that includes the torque detection device.

According to a feature of an example of the invention, a torque detection device includes: a torsion bar that couples a first shaft member and a second shaft member to each other; a permanent magnet that is fixed to the first shaft member, and that forms a magnetic field around the first shaft member; a magnetic yoke that is fixed to the second shaft member, that is arranged within the magnetic field formed by the permanent magnet, and that forms a magnetic circuit of which a magnetic flux density changes in response to a change in a position of the magnetic yoke relative to the permanent magnet due to torsion of the torsion bar; an annular magnetic flux collecting unit that includes an annular holder formed by resin molding and having a through-hole that passes through the holder in a radial direction, a magnetic flux collecting ring that is fitted to an inner periphery of the holder so as not to cover the through-hole and that collects magnetic fluxes from the magnetic yoke, and a magnetic shield that is fitted to an outer periphery of the holder so as to cover the through-hole and that reduces influence of an external magnetic field on the magnetic circuit, the magnetic flux collecting unit being arranged so as to surround the magnetic yoke; a magnetic sensor that detects magnetic fluxes, which are generated in the magnetic circuit, via the magnetic flux collecting ring; and a sensor housing that is made of resin supplied onto an outer periphery of the magnetic flux collecting unit, and that is formed so as to be integrated with the magnetic flux collecting unit.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 6A and FIG. 6B are views illustrating the torque detection device according to the first embodiment, wherein FIG. 6A is a sectional view that shows the sectional structure of a groove portion, portions near the groove portion and a positioning pin for a molding die in the magnetic flux collecting unit, and FIG. 6B is a sectional view that shows the sectional structure of the groove portion, the portions near the groove portion and the positioning pin for the molding die in the sensor unit;

DETAILED DESCRIPTION OF EMBODIMENTS

Hereinafter, embodiments of the invention will be described with reference to the accompanying drawings.

Figure 1:
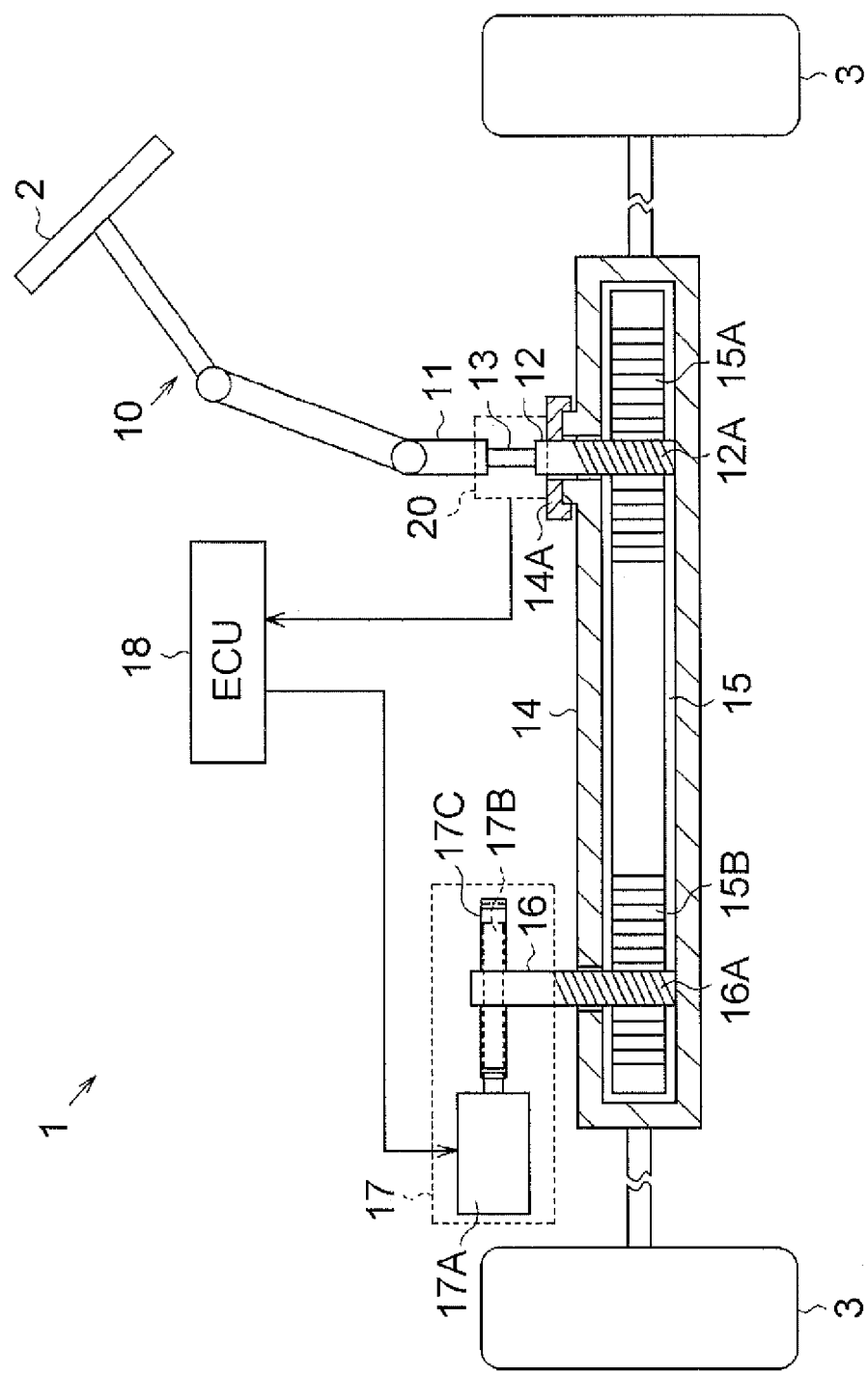
FIG. 1 is a view that shows the overall configuration of an electric power steering system according to a first embodiment of the invention.

The configuration of an electric power steering system 1 will be described with reference to FIG. 1. The electric power steering system 1 includes a steering shaft 10, a rack housing 14, a rack shaft 15, a pinion shaft 16, an assist device 17, a torque detection device 20, and an ECU 18. The ECU 18 executes drive control on the assist device 17.

The steering shaft 10 is connected to a steering wheel 2. The steering shaft 10 has a first shaft member 11, a second shaft member 12 and a torsion bar 13. The first shaft member 11 rotates together with the steering wheel 2.

The second shaft member 12 has a gear portion 12A. The second shaft member 12 is coaxial with the first shaft member 11. The torsion bar 13 couples the first shaft member 11 and the second shaft member 12 to each other. The torsion bar 13 is coaxial with the first shaft member 11 and the second shaft member 12.

The rack housing 14 accommodates the rack shaft 15. The rack housing 14 has a fixed member 14A. The fixed member 14A is fixed to a portion of the rack housing 14, which is on the steering shaft 10 side.

The rack shaft 15 is connected to the steering shaft 10 and steered wheels 3. The rack shaft 15 has a first gear portion 15A and a second gear portion 15B. The first gear portion 15A is formed in a portion on the steering shaft 10 side in the axial direction of the rack shaft 15. The first gear portion 15A is in mesh with the gear portion 12A of the second shaft member 12.

The second gear portion 15B is formed in a portion on the pinion shaft 16 side in the axial direction of the rack shaft 15. The pinion shaft 16 is connected to the rack shaft 15 and the assist device 17. The pinion shaft 16 has a gear portion 16A.

The gear portion 16A is in mesh with the second gear portion 15B of the rack shaft 15. The assist device 17 includes an electric motor 17A, a worm shaft 17B and a worm wheel 17C.

The electric motor 17A is coupled to the worm shaft 17B. The worm shaft 17B is in mesh with the worm wheel 17C. The worm wheel 17C is fixed to the pinion shaft 16.

Figure 2:
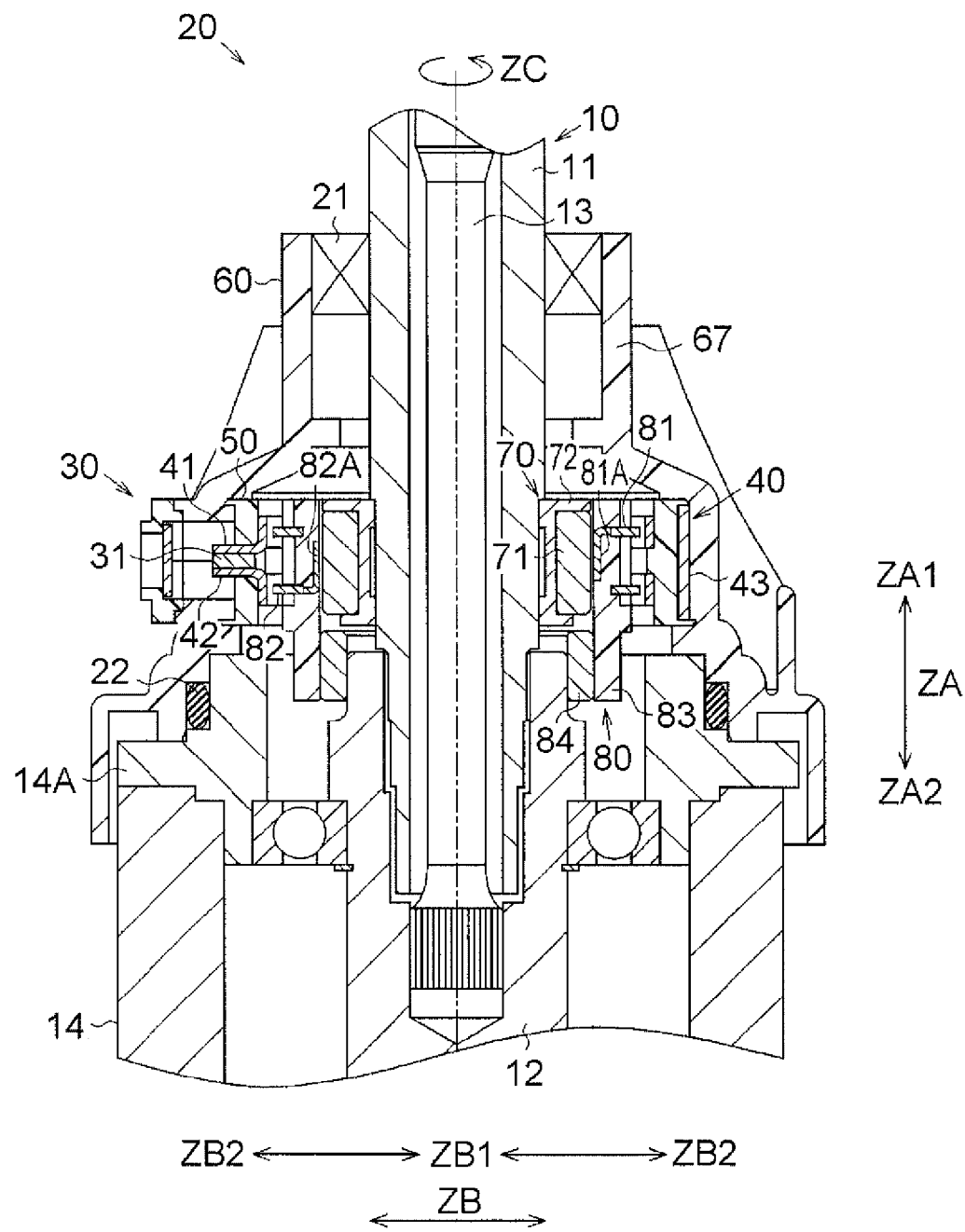
FIG. 2 is a sectional view that shows the sectional structure of a torque detection device according to the first embodiment.

The configuration of the torque detection device 20 will be described with reference to FIG. 2. An axial direction ZA, a direction toward an upper side ZA1, a direction toward a lower side ZA2, a radial direction ZB, a direction toward a radially inner side ZB1, a direction toward a radially outer side ZB2 and a circumferential direction ZC are defined as directions regarding the torque detection device 20.

The circumferential direction ZC indicates a direction around the rotation central axis of the first shaft member 11. The axial direction ZA indicates a direction along the rotation central axis of the first shaft member 11. The axial direction ZA is defined by the direction toward the upper side ZA1 and the direction toward the lower side ZA2, which are opposite directions. The direction toward the upper side ZA1 indicates a direction in which the second shaft member 12 and the first shaft member 11 are arranged in this order. The direction toward the lower side ZA2 indicates a direction in which the first shaft member 11 and the second shaft member 12 are arranged in this order.

The radial direction ZB indicates the normal direction with respect to the axial direction ZA. The radial direction ZB is defined by the direction toward the radially inner side ZB1 and the direction toward the radially outer side ZB2, which are opposite directions. The direction toward the radially inner side ZB1 indicates a direction toward the rotation central axis of the first shaft member 11. The direction toward the radially outer side ZB2 indicates a direction away from the rotation central axis of the first shaft member 11.

The torque detection device 20 detects a torque applied to the steering shaft 10. A clearance between the torque detection device 20 and the first shaft member 11 is sealed by an oil seal 21. A clearance between the torque detection device 20 and the rack housing 14 (fixed member 14A) is sealed by an O-ring 22. The torque detection device 20 includes a sensor unit 30, a magnet unit 70, and a magnetic yoke unit 80.

The magnet unit 70 is fixed to the first shaft member 11. The magnet unit 70 has a permanent magnet 71 and a core 72. The permanent magnet 71 has a cylindrical shape. The permanent magnet 71 is formed such that north poles and south poles are alternately arranged in the circumferential direction ZC. The permanent magnet 71 forms a magnetic field around the first shaft member 11.

The core 72 is fixed to the inner periphery of the permanent magnet 71. The core 72 is press-fitted to the outer periphery of the first shaft, member 11. The core 72 suppresses leakage of magnetic fluxes from the permanent magnet 71 toward the radially inner side ZB1 of the permanent magnet 71.

The magnetic yoke unit 80 is arranged so as to surround the permanent magnet 71. The magnetic yoke unit 80 is fixed to the second shaft member 12. The magnetic yoke unit 80 includes a first magnetic yoke 81, a second magnetic yoke 82, a yoke holder 83 and an intermediate member 84.

The first magnetic yoke 81 has an annular shape. The first magnetic yoke 81 is fixed to a portion of the yoke holder 83, which is on the upper side ZA1. The first magnetic yoke 81 has a plurality of teeth 81A. The first magnetic yoke 81 receives magnetic fluxes from the permanent magnet 71. The first magnetic yoke 81 forms a magnetic circuit of which the magnetic flux density changes in response to a change in a position of the first magnetic yoke 81 relative to the permanent magnet 71 due to torsion of the torsion bar 13.

Each tooth 81A has a tapered shape that tapers toward the lower side ZA2. The teeth 81A are arranged so as to be spaced apart from each other in the circumferential direction ZC. The adjacent teeth 81A are connected to each other by a connecting portion 81B.

The second magnetic yoke 82 has an annular shape. The second magnetic yoke 82 is fixed to a portion of the yoke holder 83, which is on the lower side ZA2. The second magnetic yoke 82 has a plurality of teeth 82A. The second magnetic yoke 82 receives magnetic fluxes from the permanent magnet 71. The second magnetic yoke 82 forms a magnetic circuit of which the magnetic flux density changes in response to a change in the position of the second magnetic yoke 82 relative to the permanent magnet 71 due to torsion of the torsion bar 13.

Each tooth 82A has a tapered shape that tapers toward the upper side ZA1. The teeth 82A are arranged so as to be spaced apart in the circumferential direction ZC. Each tooth 82A is arranged between the adjacent teeth 81A. The adjacent teeth 82A are connected to each other by a connecting portion 82B.

The yoke holder 83 has an annular shape. The yoke holder 83 is formed by resin molding so as to be integrated with the first magnetic yoke 81 and the second magnetic yoke 82. The intermediate member 84 has an annular shape. The outer periphery of the intermediate member 84 is press-fitted to the inner periphery of the lower end portion of the yoke holder 83. The inner periphery of the intermediate member 84 is press-fitted to the outer periphery of the upper end portion of the second shaft member 12.

The sensor unit 30 accommodates the magnet unit 70 and the magnetic yoke unit 80. The sensor unit 30 includes two magnetic sensors 31, a magnetic flux collecting unit 40 and a sensor housing 60.

The two magnetic sensors 31 are located adjacent to each other in the circumferential direction ZC. The magnetic sensors 31 each output a voltage corresponding to the magnetic flux density of the permanent magnet 71. The voltage output from each magnetic sensor 31 is transmitted to the ECU 18. A Hall IC is used as each magnetic sensor 31.

Figure 3:
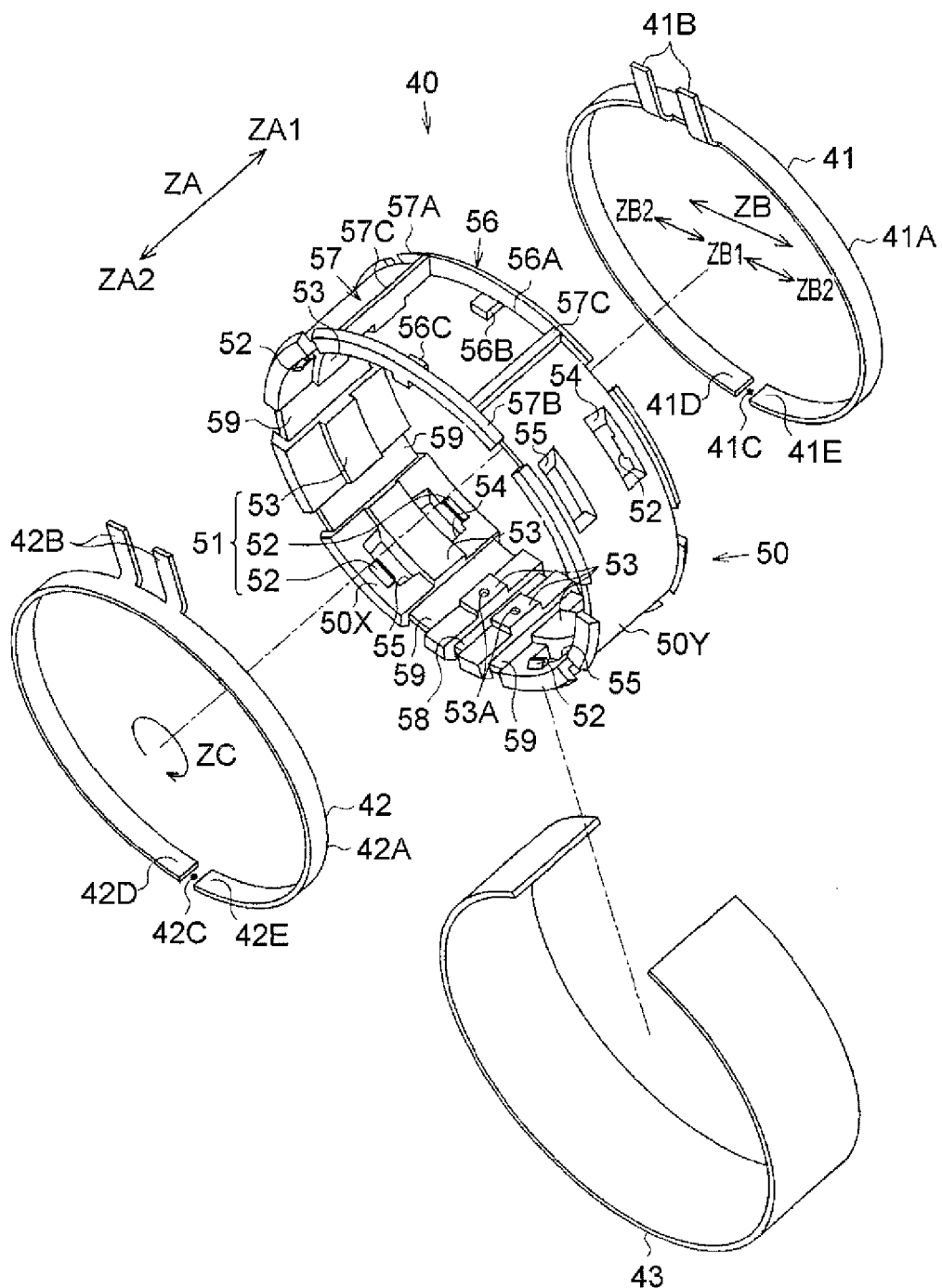
FIG. 3 is a perspective view that shows the exploded perspective structure of a magnetic flux collecting unit of the torque detection device according to the first embodiment.
Figure 4:
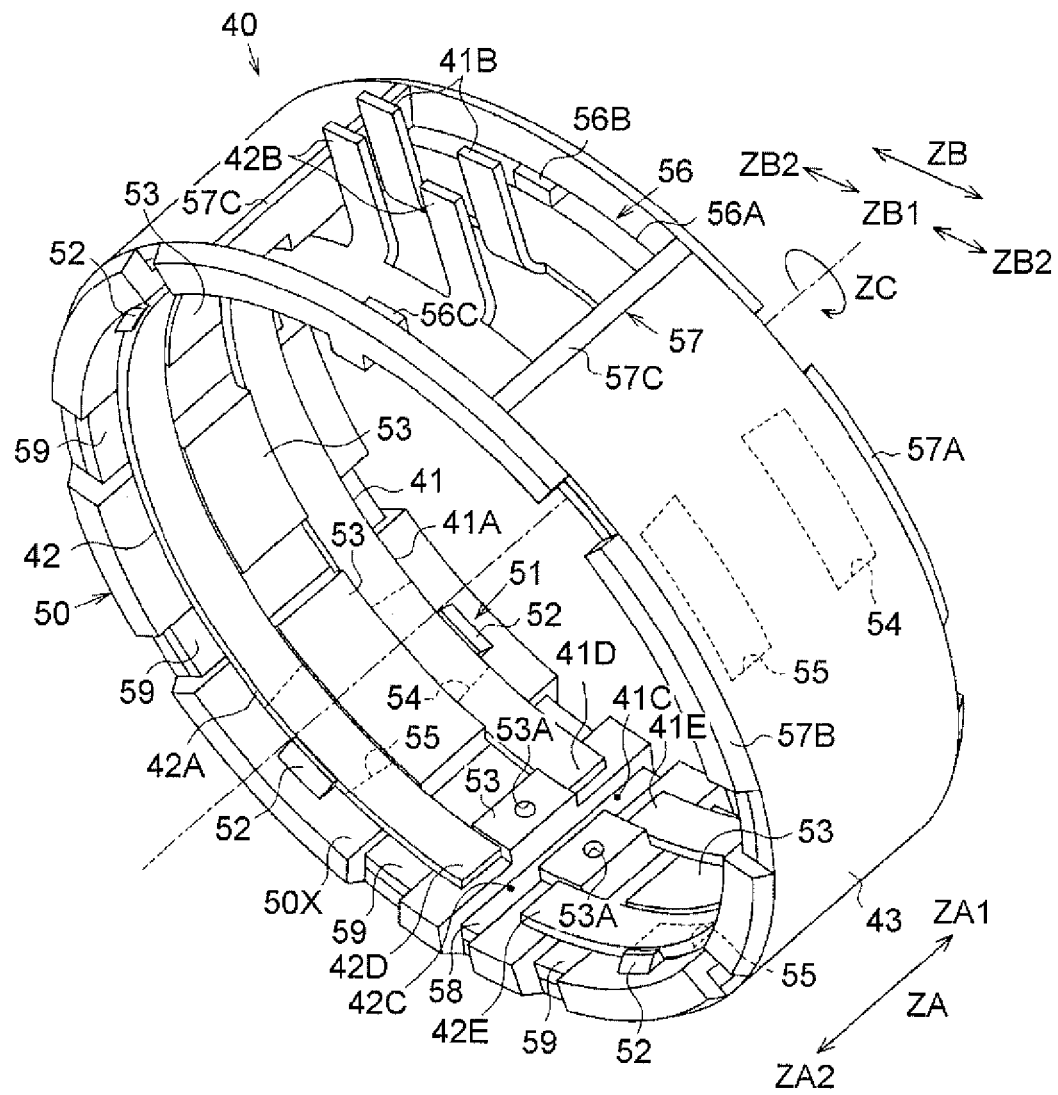
FIG. 4 is a perspective view that shows the external perspective structure of the magnetic flux collecting unit of the torque detection device according to the first embodiment.

As shown in FIG. 3 and FIG. 4, the detailed configuration of the magnetic flux collecting unit 40 will be described. The magnetic flux collecting unit 40 is arranged so as to surround the magnetic yoke unit 80. The magnetic flux collecting unit 40 includes a first magnetic flux collecting ring 41, a second magnetic flux collecting ring 42, a magnetic shield 43 and a holder 50.

The first magnetic flux collecting ring 41 is formed by bending a metal plate. The first magnetic flux collecting ring 41 faces the outer peripheral portion of the first magnetic yoke 81 with a clearance left therebetween in the radial direction ZB. The first magnetic flux collecting ring 41 collects magnetic fluxes from the first magnetic yoke 81. The first magnetic flux collecting ring 41 has a ring body 41A and two magnetic flux collecting protrusions 41B.

The ring body 41A has an annular shape having a gap. The ring body 41A has a space 41C, a first end portion 41D and a second end portion 41E. The space 41C is formed as a discontinued portion of the ring body 41A in the circumferential direction ZC.

The first end portion 41D forms one end portion of the ring body 41A. The second end portion 41E forms the other end portion of the ring body 41A. The magnetic flux collecting protrusions 41B are formed by bending so as to extend from the ring body 41A toward the radially outer side ZB2. The magnetic flux collecting protrusions 41B are located adjacent to each other in the circumferential direction ZC.

The second magnetic flux collecting ring 42 is made of the same material as that of the first magnetic flux collecting ring 41. The second magnetic flux collecting ring 42 is formed by bending a metal plate. The second magnetic flux collecting ring 42 faces the outer peripheral portion of the second magnetic yoke 82 with a clearance left therebetween in the radial direction ZB. The second magnetic flux collecting ring 42 collects magnetic fluxes from the second magnetic yoke 82. The second magnetic flux collecting ring 42 has a ring body 42A and two magnetic flux collecting protrusions 42B.

The ring body 42A has an annular shape having a gap. The ring body 42A has a space 42C, a first end portion 42D and a second end portion 42E. The space 42C is formed as a discontinued portion of the ring body 42A in the circumferential direction ZC. The space 42C is located at a position corresponding to the space 41C in the circumferential direction ZC in a state where the magnetic flux collecting rings 41, 42 are fitted to the holder 50.

The first end portion 42D forms one end portion of the ring body 42A. The second end portion 42E forms the other end portion of the ring body 42A. The magnetic flux collecting protrusions 42B are formed by bending so as to extend from the ring body 42A toward the radially outer side ZB2. The magnetic flux collecting protrusions 42B are located adjacent to each other in the circumferential direction ZC. The magnetic flux collecting protrusions 42B are located at positions corresponding to the magnetic flux collecting protrusions 41B in the circumferential direction ZC in a state where the magnetic flux collecting rings 41, 42 are fitted to the holder 50.

The magnetic shield 43 has an arc shape. The magnetic shield 43 is fitted to a shield holding portion 57 on an outer periphery 50Y of the holder 50. The magnetic shield 43 reduces the influence of an external magnetic field on the magnetic yokes 81, 82 and the magnetic flux collecting rings 41, 42.

The holder 50 has an annular shape and both sides thereof in the axial direction ZA are open. The holder 50 has an internal space that accommodates the magnetic yoke unit 80. The holder 50 holds the first magnetic flux collecting ring 41, the second magnetic flux collecting ring 42 and the magnetic shield 43. The holder 50 has a holding protrusion 51, upper through-holes 54, lower through-holes 55, an insertion portion 56, the shield holding portion 57, a groove portion 58 and communication grooves 59.

The holding protrusion 51 is formed on an inner periphery 50X of the holder 50. The holding protrusion 51 has a function of holding the first magnetic flux collecting ring 41 from both sides in the width direction of the first magnetic flux collecting ring 41 and a function of holding the second magnetic flux collecting ring 42 from both sides in the width direction of the second magnetic flux collecting ring 42. The holding protrusion 51 has a plurality of first holding portions 52 and a plurality of second holding portions 53.

The first holding portions 52 protrude from the inner periphery 50X of the holder 50 toward the radially inner side ZB1. The first holding portions 52 are formed on the inner periphery 50X of the holder 50 at positions on the upper side ZA1 and lower side ZA2 of the second holding portions 53. The first holding portions 52 are formed so as to be spaced apart from each other in the circumferential direction ZC.

The second holding portions 53 protrude from the inner periphery 50X of the holder 50 toward the radially inner side ZB1. The second holding portions 53 are formed at the center position of the holder 50 in the axial direction ZA. The second holding portions 53 are formed so as to be spaced apart from each other in the circumferential direction ZC by the groove portion 58 and the communication grooves 59. The second holding portions 53 have two through-holes 53A.

The through-holes 53A pass through the holder 50 in the radial direction ZB. The through-holes 53A are located adjacent to each other via the groove portion 58 in the circumferential direction ZC. The through-holes 53A are not covered with the first magnetic flux collecting ring 41 and the second magnetic flux collecting ring 42 from the radially inner side ZB1 in a state where the magnetic flux collecting rings 41, 42 are fitted to the holding protrusion 51. The through-holes 53A are covered with the magnetic shield 43 from the radially outer side ZB2 in a state where the magnetic shield 43 is fitted to the shield holding portion 57.

The upper through-holes 54 pass through the holder 50 in the radial direction ZB. Each upper through-hole 54 is formed in the holder 50, at a position between the corresponding upper-side first holding portion 52 and the corresponding second holding portion 53 in the axial direction ZA. The upper through-holes 54 are covered with the first magnetic flux collecting ring 41 from the radially inner side ZB1 in a state where the first magnetic flux collecting ring 41 is fitted to the holding protrusion 51. The upper through-holes 54 are covered with the magnetic shield 43 from the radially outer side ZB2 in a state where the magnetic shield 43 is fitted to the shield holding portion 57.

The lower through-holes 55 pass through the holder 50 in the radial direction ZB. Each lower through-hole 55 is formed in the holder 50, at a position between the corresponding lower-side first holding portion 52 and the corresponding second holding portion 53 in the axial direction ZA. The lower through-holes 55 are covered with the second magnetic flux collecting ring 42 from the radially inner side ZB1 in a state where the second magnetic flux collecting ring 42 is fitted to the holding protrusion 51. The lower through-holes 55 are covered with the magnetic shield 43 from the radially outer side ZB2 in a state where the magnetic shield 43 is fitted to the shield holding portion 57.

The magnetic flux collecting protrusions 41B of the first magnetic flux collecting ring 41 and the magnetic flux collecting protrusions 42B of the second magnetic flux collecting ring 42 are inserted in the insertion portion 56. The insertion portion 56 has an insertion hole 56A, an upper protrusion 56B and a lower protrusion 56C.

The upper protrusion 56B is used as a mark for positioning the first magnetic flux collecting ring 41 with respect to the holder 50 in the circumferential direction ZC. The lower protrusion 56C is used as a mark for positioning the second magnetic flux collecting ring 42 with respect to the holder 50 in the circumferential direction ZC.

The shield holding portion 57 is formed on the outer periphery 50Y of the holder 50. The shield holding portion 57 holds the magnetic shield 43. The shield holding portion 57 has an upper wall 57A, a lower wall 57B and end walls 57C.

The upper wall 57A is formed at the upper end portion of the holder 50. The upper wall 57A restricts movement of the magnetic shield 43 toward the upper side ZA1. The lower wall 57B is formed at the lower end portion of the holder 50. The lower wall 57B restricts movement of the magnetic shield 43 toward the lower side ZA2. The end walls 57C are formed at respective end portions of the insertion portion 56 in the circumferential direction ZC in the holder 50 so as to be located adjacent to each other in the circumferential direction ZC. The end walls 57C restrict movement of the magnetic shield 43 in the circumferential direction ZC.

The groove portion 58 is a recess that is recessed from the inner periphery 50X of the holder 50 toward the radially outer side ZB2. The groove portion 58 determines the position of the holder 50 with respect to a molding die used to form the sensor housing 60 when the holder 50 is arranged in the molding die.

The communication grooves 59 are recesses that are recessed from the inner periphery 50X of the holder 50 toward the radially outer side ZB2. A plurality of the communication grooves 59 are formed so as to be spaced apart from each other in the circumferential direction ZC. The communication grooves 59 are filled with resin that is a molding material of the sensor housing 60.

Figure 5:
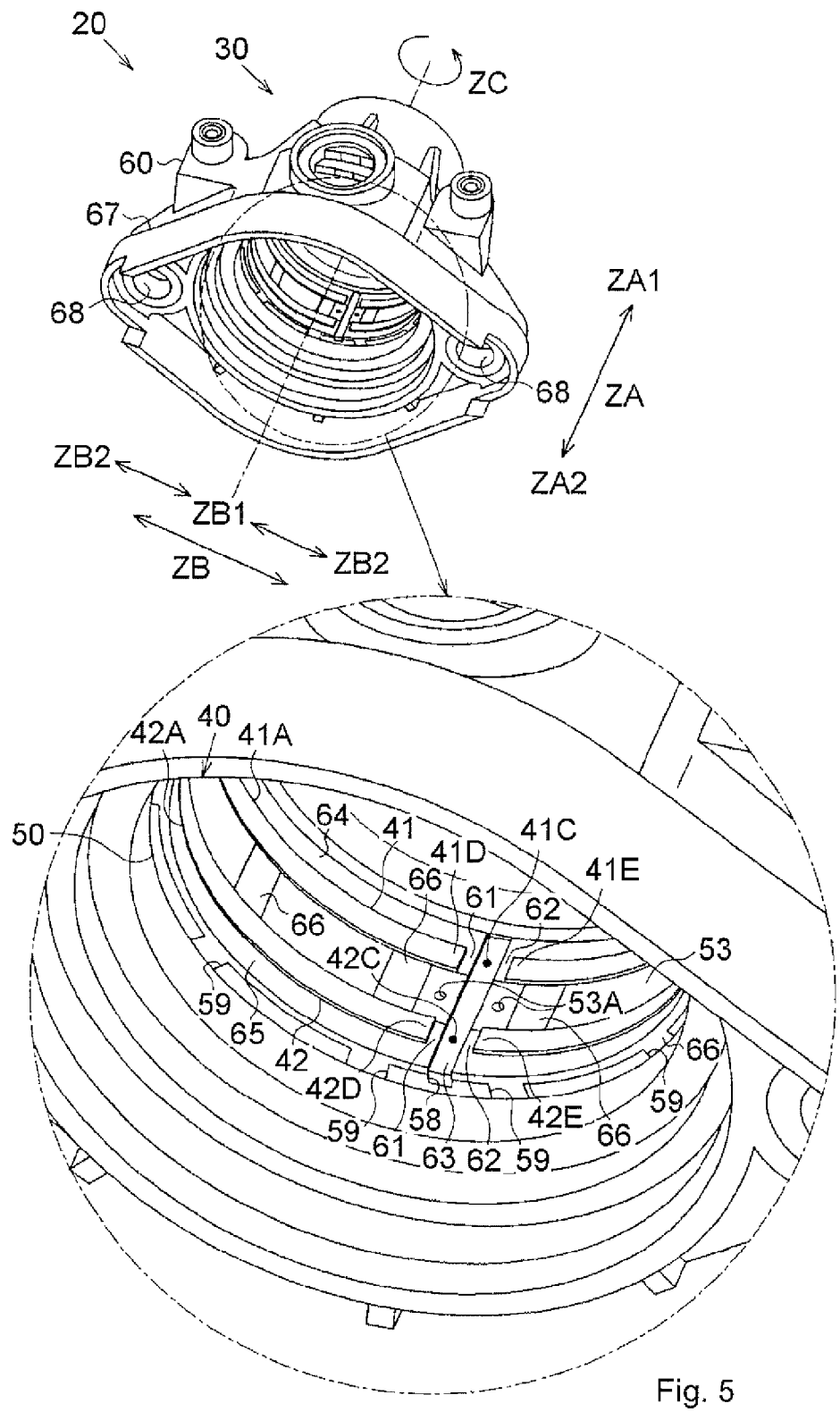
FIG. 5 is a perspective view that shows the perspective structure of a sensor unit of the torque detection device according to the first embodiment.

The detailed configuration of the sensor housing 60 will be described with reference to FIG. 5. The sensor housing 60 is made of resin supplied from the radially outer side of the magnetic flux collecting unit 40 so as to be integrated with the magnetic flux collecting unit 40. The sensor housing 60 has first peripheral walls 61, second peripheral walls 62, a filling portion 63, an upper cover portion 64, a lower cover portion 65, cover coupling portions 66 and an outer peripheral cover portion 67. In the sensor housing 60, the first peripheral walls 61, the second peripheral walls 62, the filling portion 63, the upper cover portion 64, the lower cover portion 65 and the cover coupling portions 66 are formed on the radially inner side of the magnetic flux collecting unit 40. In the sensor housing 60, the outer peripheral cover portion 67 is formed on the radially outer side of the magnetic flux collecting unit 40.

The two first peripheral walls 61 are formed so as to face each other in the axial direction ZA and so as to correspond to the first magnetic flux collecting ring 41 and the second magnetic flux collecting ring 42. The upper-side first peripheral wall 61 is formed between the first end portion 41D of the first magnetic flux collecting ring 41 and the groove portion 58 of the holder 50 in the circumferential direction ZC. The lower end face of the upper-side first peripheral wall 61 is in contact with the upper end face of the second holding portion 53. The upper-side first peripheral wall 61 restricts movement of the first end portion 41D in the circumferential direction ZC. The lower-side first peripheral wall 61 is formed between the first end portion 42D of the second magnetic flux collecting ring 42 and the groove portion 58 in the circumferential direction ZC. The upper end face of the lower-side first peripheral wall 61 is in contact with the lower end face of the second holding portion 53. The lower-side first peripheral wall 61 restricts movement of the first end portion 42D in the circumferential direction ZC.

The two second peripheral walls 62 are formed so as to face each other in the axial direction ZA and so as to correspond to the first magnetic flux collecting ring 41 and the second magnetic flux collecting ring 42. The upper-side second peripheral wall 62 is formed between the second end portion 41E of the first magnetic flux collecting ring 41 and the groove portion 58 of the holder 50 in the circumferential direction ZC. The lower end face of the upper-side second peripheral wall 62 is in contact with the upper end face of the second holding portion 53. The upper-side second peripheral wall 62 restricts movement of the second end portion 41E in the circumferential direction ZC. The lower-side second peripheral wall 62 is formed between the second end portion 42E of the second magnetic flux collecting ring 42 and the groove portion 58 in the circumferential direction ZC. The upper end face of the lower-side second peripheral wall 62 is in contact with the lower end face of the second holding portion 53. The lower-side second peripheral wall 62 restricts movement of the second end portion 42E in the circumferential direction ZC.

The upper cover portion 64 is formed between the ring body 41A of the first magnetic flux collecting ring 41 and the upper end face of the holder 50 in the axial direction ZA. The upper cover portion 64 couples the upper-side first peripheral wall 61 and the upper-side second peripheral wall 62 to each other from the side opposite to the groove portion 58 in the circumferential direction ZC.

The lower cover portion 65 is formed between the ring body 42A of the second magnetic flux collecting ring 42 and the lower end face of the holder 50 in the axial direction ZA. The lower cover portion 65 couples the lower-side first peripheral wall 61 and the lower-side second peripheral wall 62 to each other from the side opposite to the groove portion 58 in the circumferential direction ZC.

The cover coupling portions 66 are made of resin for forming the sensor housing 60, which flows into the communication grooves 59. The cover coupling portions 66 couple the upper cover portion 64 and the lower cover portion 65 to each other.

The outer peripheral cover portion 67 covers the magnetic flux collecting unit 40 from the radially outer side. The outer peripheral cover portion 67 has a portion that covers the entirety of the outer periphery of the magnetic shield 43 from the radially outer side ZB2. The outer peripheral cover portion 67 has two device mounting portions 68.

The device mounting portions 68 are formed as through-holes that pass through the outer peripheral cover portion 67 in the axial direction ZA. The device mounting portions 68 each are fixed to the fixed member 14A with a bolt. The filling portion 63 is made of resin for forming the sensor housing 60, which flows into the groove portion 58. The filling portion 63 couples the first peripheral walls 61, the second peripheral walls 62, the upper cover portion 64 and the lower cover portion 65 to each other.

Figure 6A:
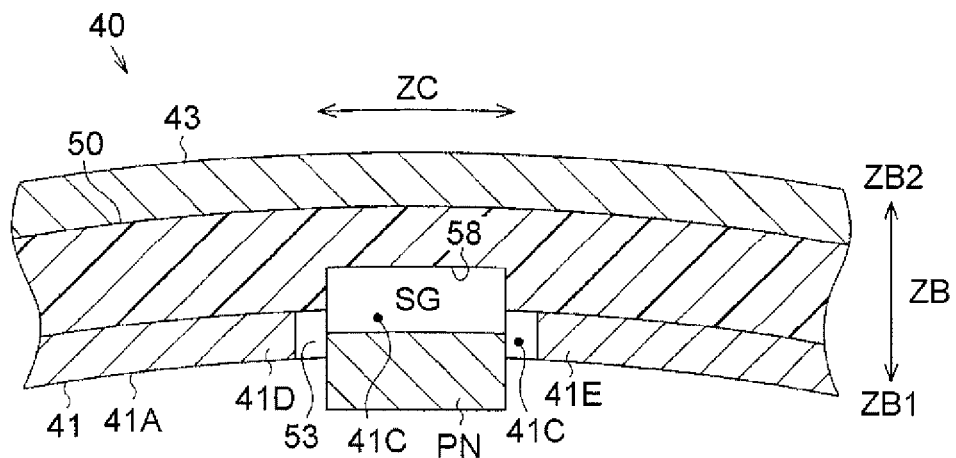

A method of manufacturing the torque detection device 20 will be described with reference to FIG. 2, FIG. 6A and FIG.

6B. The method of manufacturing the torque detection device 20 includes a magnet unit manufacturing step, a magnetic yoke unit manufacturing step, a magnetic flux collecting unit manufacturing step and a sensor housing forming step.

In the magnet unit manufacturing step, the permanent magnet 71 is fixed to the core 72. In the magnetic yoke unit manufacturing step, the first magnetic yoke 81 and the second magnetic yoke 82 are formed integrally with the yoke holder 83. Then, the intermediate member 84 is fixed to the yoke holder 83.

In the magnetic flux collecting unit manufacturing step, the first magnetic flux collecting ring 41, the second magnetic flux collecting ring 42 and the magnetic shield 43 are fitted to the holder 50. The sensor housing forming step is carried out after the magnetic flux collecting unit manufacturing step. In the sensor housing forming step, by supplying resin for forming the sensor housing 60 onto the outer periphery of the magnetic flux collecting unit 40, the sensor housing 60 is formed so as to be integrated with the magnetic flux collecting unit 40.

Figure 6B:
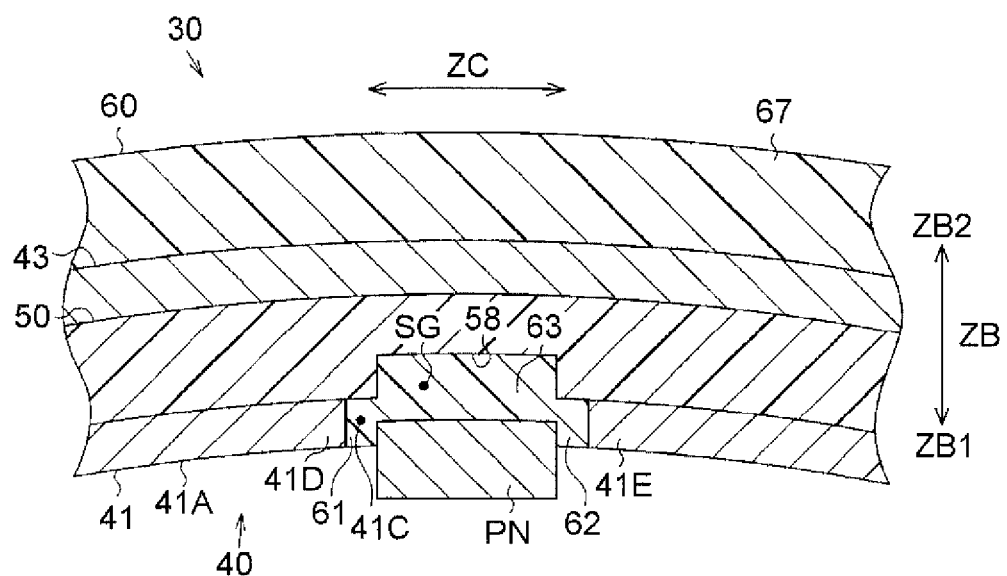

The details of the sensor housing forming step will be described. In the sensor housing forming step, a worker places the holder 50 in a molding die for forming the sensor housing 60. At this time, as shown in FIG. 6A, a positioning pin PN for determining the position of the holder 50 with respect to the molding die is arranged at a position on the radially inner side ZB1 of the groove portion 58 of the holder 50 such that a space SG is formed between the positioning pin PN and the groove portion 58. When resin that is a molding material of the sensor housing 60 is supplied onto the outer periphery of the magnetic flux collecting unit 40 by the molding die, part of the resin flows to the inner periphery side of the magnetic flux collecting unit 40 as shown in FIG. 6B. Because spaces in which the first peripheral walls 61 and the second peripheral walls 62 are formed communicate with the space SG, part of the resin flows into the space SG. In this way, the filling portion 63 is formed.

Figure 7:
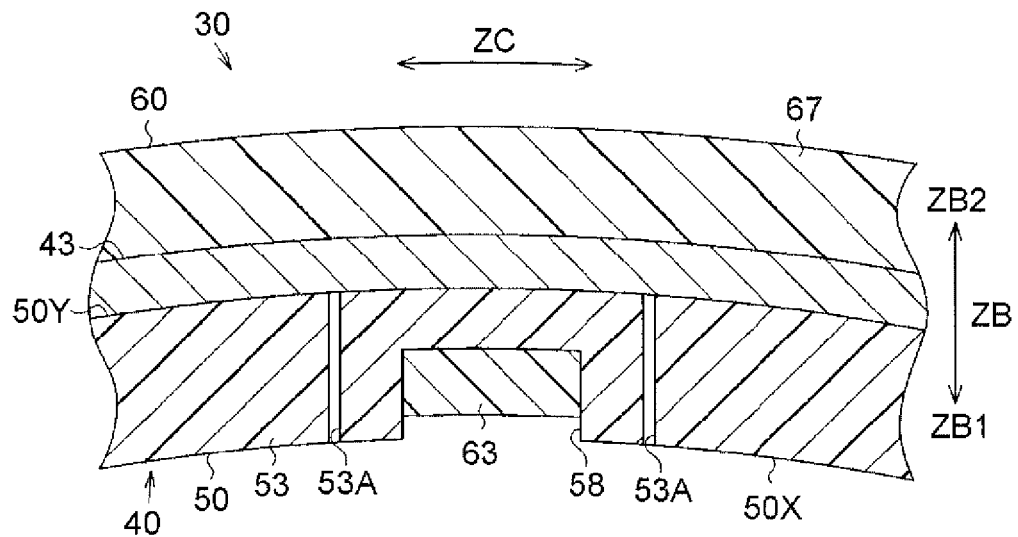
FIG. 7 is a sectional view that shows part of the sectional structure of the sensor unit of the torque detection device according to the first embodiment.
Figure 8:
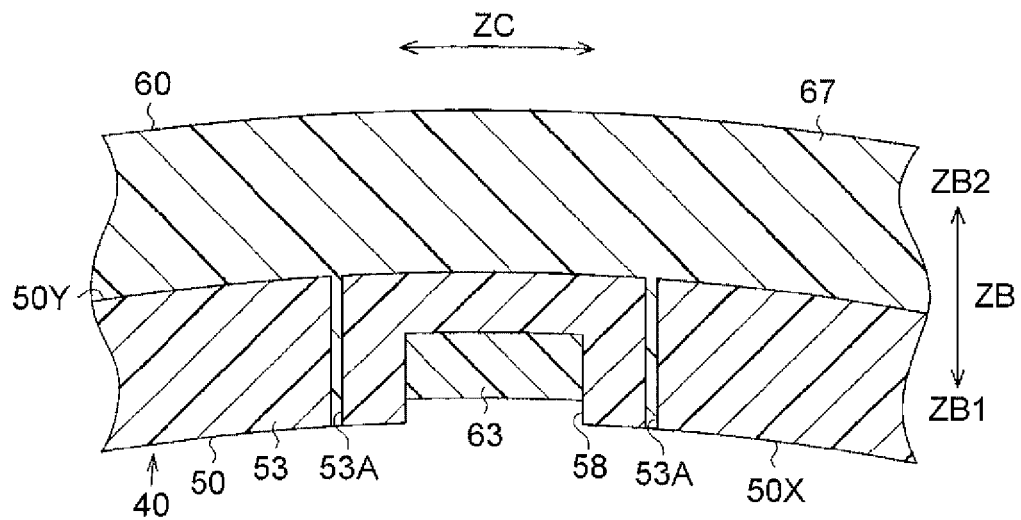
FIG. 8 is a sectional view that shows part of the sectional structure of a sensor unit of a torque detection device that is not provided with a magnetic shield.

A method of checking whether the magnetic shield 43 is fitted to the holder 50 will be described with reference to FIG. 7 and FIG. 8. As shown in FIG. 8, when the sensor housing forming step is carried out without fitting the magnetic shield 43 to the outer periphery 50Y of the holder 50 in the magnetic flux collecting unit manufacturing step, the resin supplied onto outer periphery of the magnetic flux collecting unit 40 flows into the through-holes 53A. Therefore, in the thus manufactured torque detection device, the through-holes 53A are filled with the resin for forming the sensor housing 60. On the other hand, as shown in FIG. 7, when the sensor housing forming step is carried out after the magnetic shield 43 is fitted to the outer periphery 50Y of the holder 50 in the magnetic flux collecting unit manufacturing step, the resin supplied onto the outer periphery of the magnetic flux collecting unit 40 is prevented from flowing into the through-holes 53A by the magnetic shield 43. Therefore, in the thus manufactured torque detection device 20, the through-holes 53A are open at the inner periphery 50X of the holder 50.

As described above, in the torque detection device 20, a state where the through-holes 53A are open at the inner periphery 50X of the holder 50 indicates that the magnetic shield 43 is present within the torque detection device 20.

Therefore, the worker is able to determine that the magnetic shield 43 is present within the torque detection device 20 by confirming the fact that the through-holes 53A are open at the inner periphery 50X of the holder 50. Note that the worker checks whether the through-holes 53A are open by at least one of visually checking the through-holes 53A and touching the through-holes 53A with the tip of a finger.

Figure 9A:
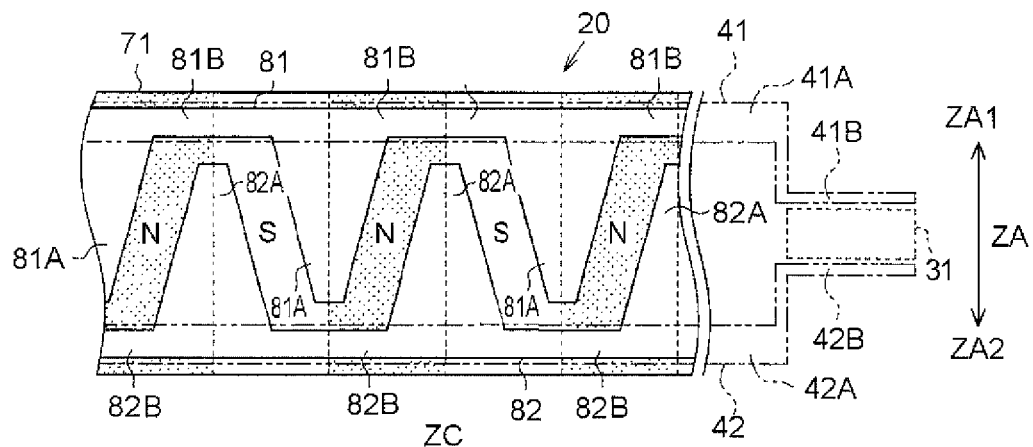
FIG. 9A to FIG. 9C are development views that respectively show positional relationships among a permanent magnet, magnetic yokes and magnetic flux collecting rings in the torque detection device according to the first embodiment.
Figure 9B:
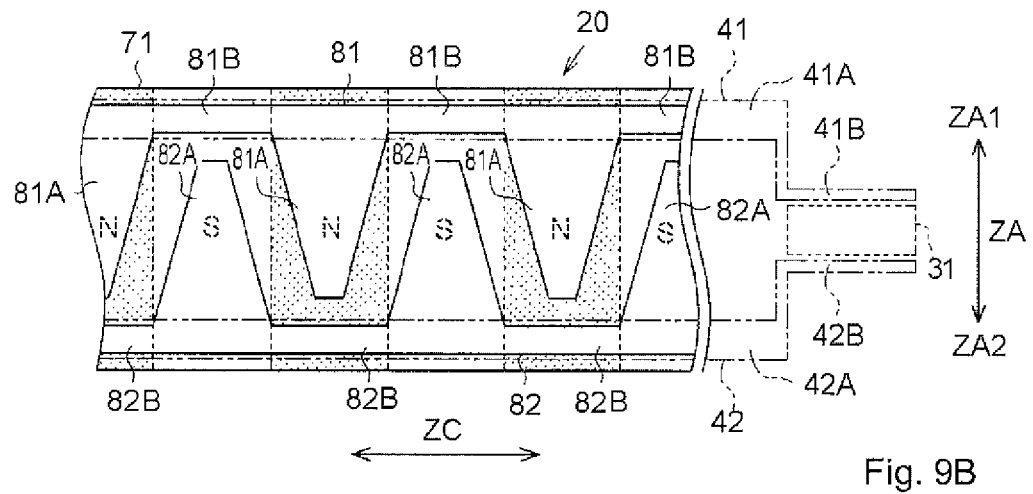
Figure 9C:
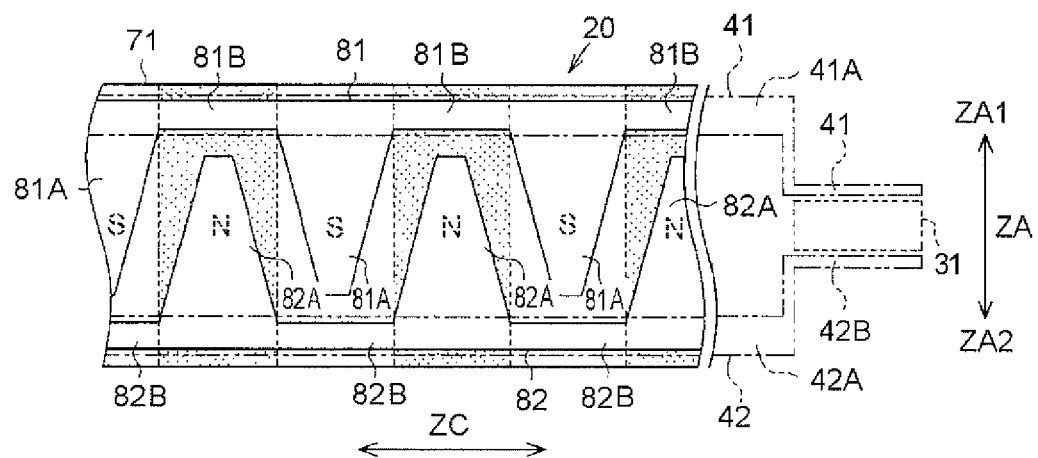

Detection of the magnetic flux density of the torque detection device 20 will be described with reference to FIG. 9A to FIG. 9C. FIG. 9A shows a state where no torque is applied between the first shaft member 11 and the second shaft member 12 that are shown in FIG. 2 (hereinafter, referred to as "neutral state"). FIG. 9B shows a state where a torque in one direction is applied between the first shaft member 11 and the second shaft member 12 (hereinafter, referred to as "right rotation state"). FIG. 9C shows a state where a torque in a direction opposite to that in the right rotation state is applied between the first shaft member 11 and the second shaft member 12 (hereinafter, referred to as "left rotation state").

A "first north pole facing area", a "first south pole facing area", a "second north pole facing area" and a "second south pole facing area" are defined as relationships between the magnetic yokes 81, 82 and the permanent magnet 71.

The first north pole facing area indicates an area at which the first magnetic yoke 81 faces the north poles of the permanent magnet 71. The first south pole facing area indicates an area at which the first magnetic yoke 81 faces the south poles of the permanent magnet 71. The second north pole facing area indicates an area at which the second magnetic yoke 82 faces the north poles of the permanent magnet 71. The second south pole facing area indicates an area at which the second magnetic yoke 82 faces the south poles of the permanent magnet 71.

As shown in FIG. 9A, in the neutral state, the distal end portions of the teeth 81A of the first magnetic yoke 81 and the distal end portions of the teeth 82A of the second magnetic yoke 82 each are located at a boundary portion between the north pole and the south pole of the permanent magnet 71. At this time, the first north pole facing area and the first south pole facing area are equal to each other. The second north pole facing area and the second south pole facing area are equal to each other. Therefore, no magnetic fluxes are generated between the magnetic flux collecting protrusions 41B of the first magnetic flux collecting ring 41 and the magnetic flux collecting protrusions 42B of the second magnetic flux collecting ring 42. Therefore, the voltage output from each magnetic sensor 31 indicates "0".

As shown in FIG. 9B, in the right rotation state, the torsion bar 13 is twisted from the neutral state. Therefore, the relative position between the magnetic yokes 81, 82 and the permanent magnet 71 changes. As a result, the first north pole facing area becomes larger than the first south pole facing area. In addition, the second north pole facing area becomes smaller than the second south pole facing area. Therefore, the amount of magnetic fluxes that enter the first magnetic yoke 81 from the north poles of the permanent magnet 71 is larger than the amount of magnetic fluxes that exit from the first magnetic yoke 81 to the south poles of the permanent magnet 71. In addition, the amount of magnetic fluxes that enter the second magnetic yoke 82 from the north poles of the permanent magnet 71 is smaller than the amount of magnetic fluxes that exit from the second magnetic yoke 82 to the south poles of the permanent magnet 71. Therefore, magnetic fluxes flow from the magnetic flux collecting protrusions 41B of the first magnetic flux collecting ring 41 to the magnetic flux collecting protrusions 42B of the second magnetic flux collecting ring 42. Each magnetic sensor 31 outputs a voltage corresponding to the magnetic fluxes.

As shown in FIG. 9C, in the left rotation state, the torsion bar 13 twists from the neutral state in a direction opposite to that in the right rotation state. Therefore, the relative position between the magnetic yokes 81, 82 and the permanent magnet 71 changes in a direction opposite to that in the right rotation state. As a result, the first north pole facing area becomes smaller than the first south pole facing area. In addition, the second north pole facing area becomes larger than the second south pole facing area. Therefore, the amount of magnetic fluxes that enter the first magnetic yoke 81 from the north poles of the permanent magnet 71 is smaller than the amount of magnetic fluxes that exit from the first magnetic yoke 81 to the south poles of the permanent magnet 71. In addition, the amount of magnetic fluxes that enter the second magnetic yoke 82 from the north poles of the permanent magnet 71 is larger than the amount of magnetic fluxes that exit from the second magnetic yoke 82 to the south poles of the permanent magnet 71. Therefore, magnetic fluxes flow from the magnetic flux collecting protrusions 42B of the second magnetic flux collecting ring 42 to the magnetic flux collecting protrusions 41B of the first magnetic flux collecting ring 41. Each magnetic sensor 31 outputs a voltage corresponding to the magnetic fluxes.

The electric power steering system 1 according to the present embodiment produces the following advantageous effects.

(1) The torque detection device 20 is fixed to the rack housing 14. Therefore, water may adhere to the torque detection device 20 while the vehicle is travelling. The torque detection device 20 includes the sensor housing 60 that is formed so as to be integrated with the magnetic flux collecting unit 40. With this configuration, it is possible to suppress entry of water between the magnetic flux collecting unit 40 and the sensor housing 60 while the vehicle is travelling.

(2) The through-holes 53A are formed in the second holding portions 53 of the holder 50. The through-holes 53A are covered with the magnetic shield 43 from the radially outer side ZB2. The through-holes 53A are not covered with the magnetic flux collecting rings 41, 42 from the radially inner side ZB1. The sensor housing 60 is formed so as to be integrated with the magnetic flux collecting unit 40 by resin supplied onto the outer periphery of the magnetic flux collecting unit 40. With this configuration, resin for forming the sensor housing 60 is prevented from flowing into the through-holes 53A by the magnetic shield 43. Therefore, the worker is able to confirm that the magnetic shield 43 is present within the torque detection device 20 by checking the fact that the through-holes 53A are open. Thus, the worker is able to easily carry out a work for checking whether the magnetic shield 43 is present.

(3) The sensor housing 60 has the filling portion 63 with which the groove portion 58 is filled. With this configuration, the first peripheral walls 61 and the second peripheral walls 62 are reinforced by the filling portion 63. Therefore, when an ambient temperature around the torque detection device 20 changes, deformation of the first peripheral walls 61 and second peripheral walls 62 due to heat shrink of the sensor housing 60 is suppressed. Thus, changes in the inside diameters of the magnetic flux collecting rings 41, 42 due to heat expansion of the magnetic flux collecting rings 41, 42 are suppressed. Thus, a change in the voltage output from each magnetic sensor 31 due to changes in the inside diameters of the magnetic flux collecting rings 41, 42 is suppressed.

Figure 10:
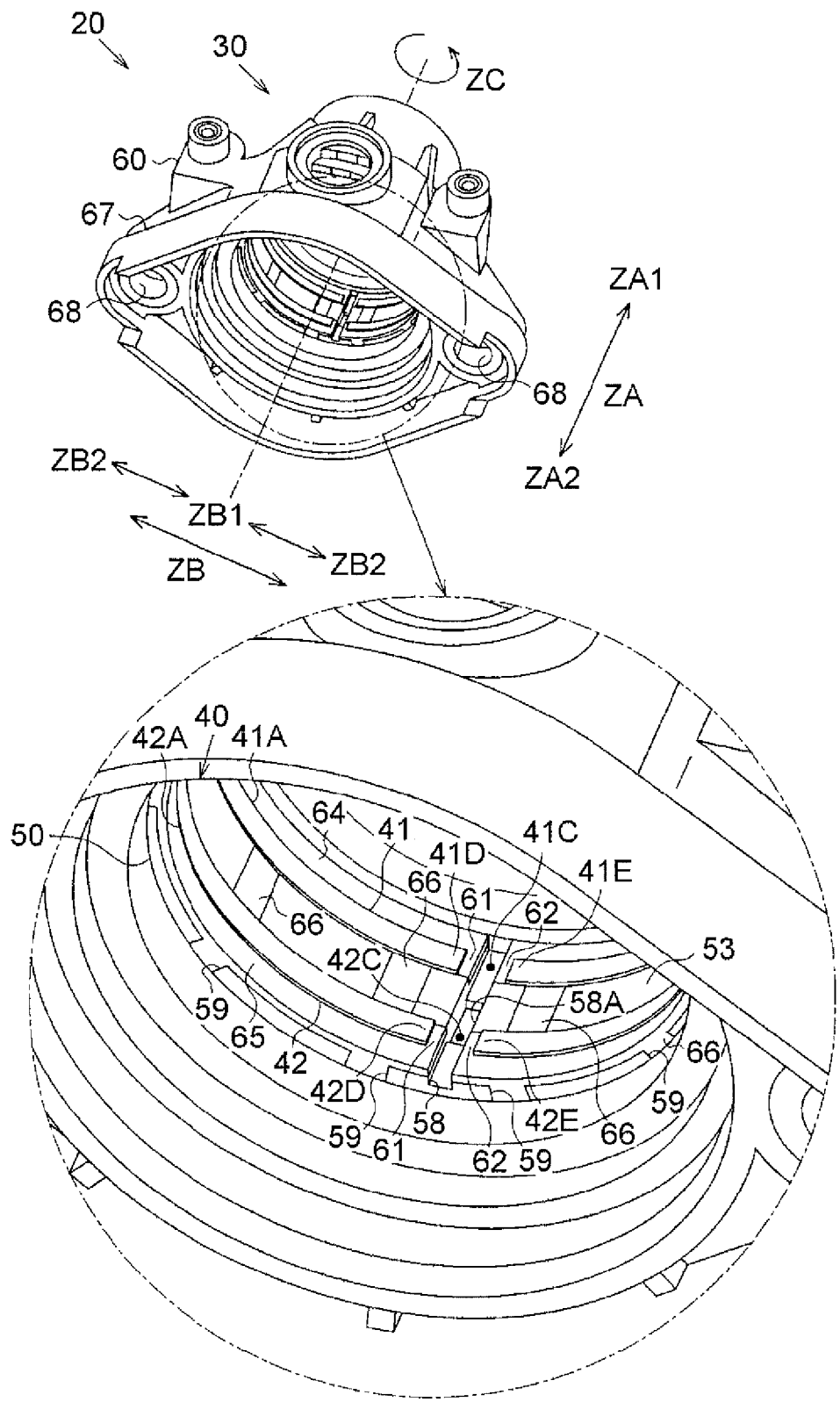
FIG. 10 is a perspective view that shows the perspective structure of a sensor unit of a torque detection device according to a second embodiment of the invention.

FIG. 10 shows the torque detection device 20 according to a second embodiment of the invention. The torque detection device 20 differs from the torque detection device 20 according to the first embodiment shown in FIG. 5 mainly in the following points. That is, the torque detection device 20 according to the second embodiment differs from the torque detection device 20 according to the first embodiment in the shape of each second holding portion 53 of the holder 50 and the shape of the groove portion 58 of the holder 50. In addition, the sensor housing 60 according to the second embodiment does not have the filling portion 63. Hereinafter, the details of the differences from the torque detection device 20 according to the first embodiment will be described. Note that the same components as those in the first embodiment will be denoted by the same reference numerals as those in the first embodiment, and part or all of the description thereof will be omitted.

The second holding portions 53 of the holder 50 do not have the through-holes 53A. A through-hole 58A is formed in the groove portion 58 of the holder 50. The through-hole 58A passes through the holder 50 in the radial direction ZB. The size of the through-hole 58A in the axial direction ZA is equal to the size of each second holding portion 53 in the axial direction ZA. The size of the through-hole 58A in the circumferential direction ZC is equal to the size of the groove portion 58 in the circumferential direction ZC. The through-hole 58A is formed between the first magnetic flux collecting ring 41 and the second magnetic flux collecting ring 42 in the axial direction ZA.

A portion of the magnetic shield 43, which corresponds to the through-hole 58A, may deform toward the radially inner side ZB1 due to resin pressure during formation of the sensor housing 60. Meanwhile, the through-hole 58A is formed in the groove portion 58 that corresponds to the spaces 41C, 42C of the respective magnetic flux collecting rings 41, 42. In addition, the through-hole 58A is formed between the first magnetic flux collecting ring 41 and the second magnetic flux collecting ring 42 in the axial direction ZA. Therefore, the magnetic flux collecting rings 41, 42 are not arranged at a portion of the magnetic shield 43, which corresponds to the through-hole 58A. Therefore, the influence of magnetism on the magnetic flux collecting rings 41, 42 at the time when the magnetic shield 43 deforms due to resin pressure is small. Thus, it is possible to suppress a change in the voltage output from each magnetic sensor 31 due to a deformation of the magnetic shield 43.

The electric power steering system 1 according to the present embodiment produces the following advantageous effects in addition to the advantageous effects (1) and (2) of the electric power steering system 1 according to the first embodiment.

(4) The through-hole 58A is formed in the groove portion 58, at a position between the first magnetic flux collecting ring 41 and the second magnetic flux collecting ring 42 in the axial direction ZA. With this configuration, it is possible to suppress a change in the voltage output from each magnetic sensor 31 due to a deformation of a portion of the magnetic shield 43, which corresponds to the through-hole 58A.

The invention includes embodiments other than the first and second embodiments. Hereinafter, modified examples of the first and second embodiments will be described as other embodiments of the invention. The following modified examples may be combined with each other.

The holder 50 according to the first embodiment has the through-holes 53A, at portions adjacent to the groove portion 58 in the circumferential direction ZC. On the other hand, the holder 50 according to a modified example may have the through-holes 53A, at portions apart from the groove portion 58 in the circumferential direction ZC.

The holder 50 according to the first embodiment has the two through-holes 53A at the second holding portions 53. On the other hand, the holder 50 according to a modified example has the single through-hole 53A at the second holding portions 53. Alternatively, the holder 50 according to another modified example may have three or more through-holes 53A at the second holding portions 53.

The holder 50 according to the first embodiment has the through-holes at the second holding portions 53. On the other hand, the holder 50 according to a modified example may have the through-holes 53A at the first holding portions 52. The through-holes 53A are not filled with resin during formation of the sensor housing 60. Therefore, a molding die used to form the holder 50 or the sensor housing 60 has a portion that prevents resin for forming the sensor housing 60 from flowing into the through-holes 53A.

The holder 50 according to the first embodiment has the through-holes 53A at portions between the first magnetic flux collecting ring 41 and the second magnetic flux collecting ring 42 in the axial direction ZA. On the other hand, the holder 50 according to a modified example may have the through-holes 53A at portions on the upper side ZA1 with respect to the first magnetic flux collecting ring 41. The through-holes 53A are not filled with resin during formation of the sensor housing 60. Therefore, a molding die used to form the holder 50 or the sensor housing 60 has a portion that prevents resin for forming the sensor housing 60 from flowing into the through-holes 53A. Alternatively, the holder 50 according to another modified example may have the through-holes 53A at portions on the lower side ZA2 with respect to the second magnetic flux collecting ring 42. The through-holes 53A are not filled with resin during formation of the sensor housing 60. Therefore, a molding die used to form the holder 50 or the sensor housing 60 has a portion that prevents resin for forming the sensor housing 60 from flowing into the through-holes 53A.

The sensor housing 60 according to the first embodiment has the filling portion 63. On the other hand, the sensor housing 60 according to a modified example need not have the filling portion 63.

The sensor housing 60 according to the first embodiment has the first peripheral walls 61 and the second peripheral walls 62. On the other hand, the sensor housing 60 according to a modified example need not have the first peripheral walls 61 and the second peripheral walls 62.

The holder 50 according to the second embodiment has the single through-hole 58A at the groove portion 58. On the other hand, the holder 50 according to a modified example may have a plurality of the through-holes 58A at the groove portion 58.

The holder 50 according to the second embodiment has the through-hole 58A, at a position between the first magnetic flux collecting ring 41 and the second magnetic flux collecting ring 42 in the axial direction ZA. On the other hand, the holder 50 according to a modified example may have the through-hole 58A at a portion on the upper side ZA1 with respect to the lower end portion of the first magnetic flux collecting ring 41 in the axial direction ZA. Alternatively, the holder 50 according to a modified example may have the through-hole 58A at a portion on the lower side ZA2 with respect to the upper end portion of the second magnetic flux collecting ring 42 in the axial direction ZA.

The holder 50 according to the second embodiment has the single through-hole 58A at the groove portion 58. On the other hand, the holder 50 according to a modified example may have the through-hole 58A at a portion offset from the groove portion 58 in the circumferential direction ZC. Alternatively, the holder 50 according to another modified example may have the through-hole 53A at the holding protrusion 51 in addition to the through-hole 58A of the groove portion 58.

The first magnetic flux collecting ring 41 according to the first and second embodiments has the space 41C. On the other hand, the first magnetic flux collecting ring 41 according to a modified example need not have the space 41C. That is, the first magnetic flux collecting ring 41 according to a modified example may have an annular shape.

The second magnetic flux collecting ring 42 according to the first and second embodiments has the space 42C. On the other hand, the second magnetic flux collecting ring 42 according to a modified example need not have the space 42C. That is, the second magnetic flux collecting ring 42 according to a modified example may have an annular shape.

In the magnetic flux collecting unit 40 according to the first and second embodiments, the magnetic flux collecting rings 41, 42 are fitted to the holding protrusion 51 of the holder 50. On the other hand, in the magnetic flux collecting unit 40 according to a modified example, the holder 50 may be formed so as to be integrated with the magnetic flux collecting rings 41, 42. The holder 50 need not have the holding protrusion 51.

The holder 50 according to the first and second embodiments has the groove portion 58. On the other hand, the holder 50 according to a modified example need not have the groove portion 58.

The torque detection device 20 according to, the first and second embodiments has the two magnetic sensors 31. On the other hand, the torque detection device 20 according to a modified example may have the single magnetic sensor 31. The first magnetic flux collecting ring 41 may have the single magnetic flux collecting protrusion 41B. The second magnetic flux collecting ring 42 may have the single magnetic flux collecting protrusion 42B. Alternatively, the torque detection device 20 according to another modified example may have a magnetic detection element, such as a Hall element and an MR element, as the magnetic sensor 31 instead of the Hall IC.

The torque detection device 20 that includes the sensor unit 30 according to the invention may also be applied to an electric power steering system having a configuration other than that of the electric power steering system 1 described in the first and second embodiments.

What is claimed is:

1. A torque detection device, comprising:
a torsion bar that couples a first shaft member and a second shaft member to each other;
a permanent magnet that is fixed to the first shaft member, and that forms a magnetic field around the first shaft member;
a magnetic yoke that is fixed to the second shaft member, that is arranged within the magnetic field formed by the permanent magnet, and that forms a magnetic circuit of which a magnetic flux density changes in response to a change in a position of the magnetic yoke relative to the permanent magnet due to torsion of the torsion bar;
an annular magnetic flux collecting unit that includes: an annular holder formed by resin molding and having a through-hole that passes through the holder in a radial direction; a magnetic flux collecting ring that is fitted to an inner periphery of the holder so as not to cover the through-hole and that collects magnetic fluxes from the magnetic yoke; and a magnetic shield that is fitted to an outer periphery of the holder so as to cover the through-hole and that reduces influence of an external magnetic field on the magnetic circuit, the magnetic flux collecting unit being arranged so as to surround the magnetic yoke, a magnetic sensor that detects magnetic fluxes, which are generated in the magnetic circuit, via the magnetic flux collecting ring; and
a sensor housing that is made of resin supplied onto an outer periphery of the magnetic flux collecting unit, and that is formed so as to be integrated with the magnetic flux collecting unit.

2. The torque detection device according to claim 1, wherein:
- the magnetic flux collecting ring has a first magnetic flux collecting ring and a second magnetic flux collecting ring that are spaced apart from each other in an axial direction of the holder, and that are fitted to the holder;
- the holder has a holding protrusion that has a function of holding the first magnetic flux collecting ring from both sides in a width direction of the first magnetic flux collecting ring and a function of holding the second magnetic flux collecting ring from both sides in a width direction of the second magnetic flux collecting ring; and
- the holding protrusion has the through-hole.

3. The torque detection device according to claim 1, wherein:
- the magnetic flux collecting ring has a space that is formed as a discontinued portion in a circumferential direction;
- the holder has a groove portion at a portion of the inner periphery of the holder, the portion corresponding to the space; and
- the through-hole is formed in the groove portion.

4. An electric power steering system, comprising the torque detection device according to claim 1.

5. A method of manufacturing a torque detection device that includes:
- a torsion bar that couples a first shaft member and a second shaft member to each other;
- a permanent magnet that is fixed to the first shaft member, and that forms a magnetic field around the first shaft member;
- a magnetic yoke that is fixed to the second shaft member, that is arranged within the magnetic field formed by the permanent magnet, and that forms a magnetic circuit of which a magnetic flux density changes in response to a change in a position of the magnetic yoke relative to the permanent magnet due to torsion of the torsion bar;
- an annular magnetic flux collecting unit that includes: an annular holder formed by resin molding and having a through-hole that passes through the holder in a radial direction; a magnetic flux collecting ring that is fitted to an inner periphery of the holder so as not to cover the through-hole and that collects magnetic fluxes from the magnetic yoke; and a magnetic shield that is fitted to an outer periphery of the holder so as to cover the through-hole and that reduces influence of an external magnetic field on the magnetic circuit, the magnetic flux collecting unit being arranged so as to surround the magnetic yoke;
- a magnetic sensor that detects magnetic fluxes, which are generated in the magnetic circuit, via the magnetic flux collecting ring; and
- a sensor housing that is made of resin supplied onto an outer periphery of the magnetic flux collecting unit, and that is formed so as to be integrated with the magnetic flux collecting unit, the method comprising:
- a magnetic flux collecting unit manufacturing step of assembling the magnetic flux collecting unit; and
- a sensor housing forming step of forming the sensor housing by supplying resin onto the outer periphery of the magnetic flux collecting unit after the magnetic flux collecting unit manufacturing step.

* * * * *